US011136097B2

(12) United States Patent
Sandberg et al.

(10) Patent No.: US 11,136,097 B2
(45) Date of Patent: Oct. 5, 2021

(54) SYSTEM FOR DANGEROUS CURRENT IDENTIFICATION, CHARACTERIZATION, ALERTING AND FOR DISTRESSED SWIMMER LOCATION AND ASSISTANCE

(71) Applicant: BSS Technologies, Inc., Takoma Park, MD (US)

(72) Inventors: William C. Sandberg, Takoma Park, MD (US); Jason D. Geder, Arlington, VA (US); Marius Pruessner, Silver Spring, MD (US); Eric Wang, Lorton, VA (US)

(73) Assignee: BSS TECHNOLOGIES, INC., Takoma Park, MD (US)

( * ) Notice: Subject to any disclaimer, the term of this patent is extended or adjusted under 35 U.S.C. 154(b) by 247 days.

(21) Appl. No.: 16/037,685

(22) Filed: Jul. 17, 2018

(65) Prior Publication Data

US 2020/0023926 A1 Jan. 23, 2020

(51) Int. Cl.
*B63B 35/00* (2020.01)
*B63B 45/00* (2006.01)
(Continued)

(52) U.S. Cl.
CPC .............. *B63C 9/02* (2013.01); *B63B 45/00* (2013.01); *B63B 45/02* (2013.01); *B63B 45/08* (2013.01);
(Continued)

(58) Field of Classification Search
CPC ......... B63B 45/00; B63B 45/08; B63B 45/02; B63B 2211/00; B63B 2045/005;
(Continued)

(56) References Cited

U.S. PATENT DOCUMENTS

| 7,789,723 B2 | 9/2010 | Dane et al. |
| 9,096,106 B2 | 8/2015 | Hanson et al. |
| (Continued) | | |

FOREIGN PATENT DOCUMENTS

| KR | 10-2015-0051272 | | 5/2015 | |
| KR | 20150051272 A | * | 5/2015 | |
| WO | WO-2015144947 A1 | * | 10/2015 | .......... A47J 31/3609 |

OTHER PUBLICATIONS

Australian Office Action dated Nov. 14, 2019 issued in AU Application No. 2019201190.

*Primary Examiner* — Abby Y Lin
*Assistant Examiner* — Hossam M Abd El Latif
(74) *Attorney, Agent, or Firm* — Ked & Associates, LLP

(57) ABSTRACT

A vessel includes a body, such as surfboard, that floats in water. One or more thrusters, and one or more sensors are provided on the body. A controller is configured to selectively activate the thrusters to cause the vessel to move along a path through the water, receive sensor data from the one or more sensors while the vessel is moving along the path, determine, based on the sensor data, whether a dangerous condition is present in the water; and output a warning when the dangerous condition is present in the water. For example, the collected sensor data may relate to locations and directions of currents in the water, the dangerous condition may relate to a rip current, and the warning may identify at least one attribute of the rip current. A map identifying a location of the dangerous condition may be generated and forwarded to other devices.

21 Claims, 11 Drawing Sheets

(51) Int. Cl.
    *B63B 45/02*  (2006.01)
    *B63B 45/08*  (2006.01)
    *B63B 79/15*  (2020.01)
    *B63C 9/02*   (2006.01)
    *G05D 1/00*   (2006.01)
    *G05D 1/02*   (2020.01)
(52) U.S. Cl.
    CPC .......... *G05D 1/0016* (2013.01); *G05D 1/0038*
         (2013.01); *G05D 1/0206* (2013.01); *B63B
         2045/005* (2013.01); *B63B 2201/02* (2013.01);
         *B63B 2201/04* (2013.01); *B63B 2211/00*
                                                (2013.01)
(58) Field of Classification Search
    CPC . B63B 2201/02; B63B 2201/04; B63B 79/15;
         B63B 2035/007; B63C 9/02; G05D
         1/0206; G05D 1/0038; G05D 1/0016;
         G08B 21/10; G06K 9/6251; Y02T
         70/5236; Y02T 10/7072; Y02T 70/5245;
         Y02T 90/38; B63H 2021/171; B63H
         21/20; B63H 9/0607; B63H 9/061; G01S
                                            13/956

USPC .......................................................... 701/2
    See application file for complete search history.

(56)         References Cited

U.S. PATENT DOCUMENTS

2003/0112171 A1*  6/2003  Michaelson ............ B63B 43/18
                                                        342/41
    2004/0056779 A1*  3/2004  Rast ....................... B63B 22/16
                                                        340/985
    2005/0271266 A1  12/2005  Perrier
    2009/0316671 A1* 12/2009  Rolf ...................... H04W 4/029
                                                        370/338
    2012/0290164 A1* 11/2012  Hanson .................... B60F 5/00
                                                        701/23
    2014/0111332 A1*  4/2014  Przybylko .......... G08B 21/0269
                                                        340/539.1
    2015/0277442 A1* 10/2015  Ballou ................ G05D 1/0206
                                                        701/21
    2017/0205829 A1*  7/2017  Tyers ...................... G01S 19/13
    2018/0108240 A1*  4/2018  Fusco .................... G08B 21/10
    2019/0161152 A1*  5/2019  Kusters, Jr. ........... G06T 11/206
    2019/0339700 A1* 11/2019  Berg ..................... B63H 9/061

* cited by examiner

FIG. 2B
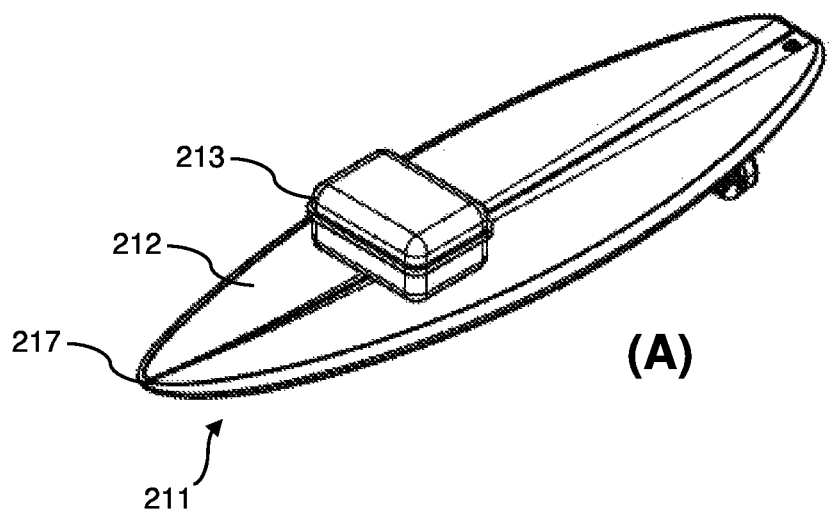
(A)
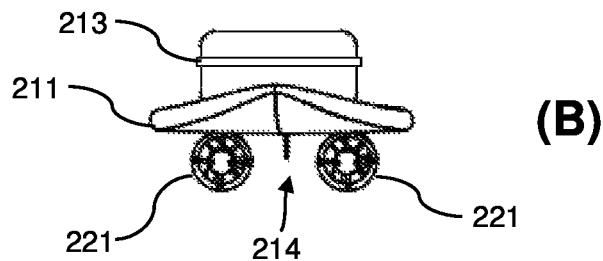
(B)
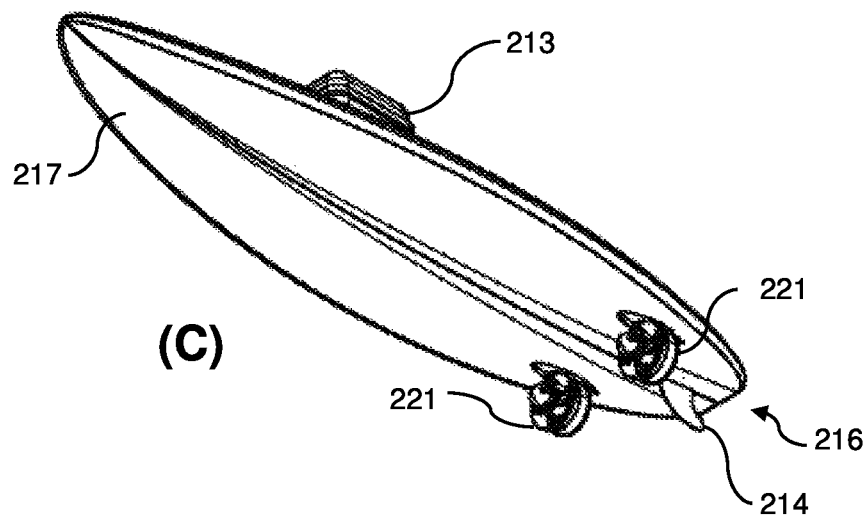
(C)

SYSTEM FOR DANGEROUS CURRENT IDENTIFICATION, CHARACTERIZATION, ALERTING AND FOR DISTRESSED SWIMMER LOCATION AND ASSISTANCE

BACKGROUND

Various types of dangerous swimming and water conditions may occur near a shore. For example, a rip current is a strong and localized outward flow that may occur at portions of the shore, and the rip current may carry swimmers away from the shore and into deeper water. Other types of dangerous conditions occurring near a shore may include harmful contamination of the water due to, for example, sewage leaks, oil spills, or natural conditions, such as algae blooms or water currents that dislodge previously trapped contaminants. These and other dangerous conditions may be difficult to detect before swimmers are harmed and without significant training or complicated equipment.

BRIEF DESCRIPTION OF THE DRAWINGS

FIGS. 2A and 2B illustrate an example of a vessel used in the environment of FIGS. 1A-1C according to certain embodiments;

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

As described herein, a vessel may be used to detect and warn of rip currents and other dangerous conditions. For example, the vessel may be a radio-controlled unmanned vehicle that improves beach safety by identifying the existence of, quantifying the strength and extent of, and issuing visual and electronic alerts to swimmers and beach safety personnel, of rip currents. Additionally, the vessel may also locate, go to, and aid swimmers in distress. The vessel may include various optical, thermal, and acoustic sensors to detect dangerous conditions and to aid in distressed swimmer location that can be used in day or night swimmer location and assistance operations. The vessel may also enable audio communications between the distressed swimmer and beach safety personnel to enable the beach safety personnel to give instructions to the swimmer and to alert the swimmer that assistance is in route. Additionally, the vessel may monitor the water quality for contaminants and provide alerts if health department levels of one or more contaminants are present. The vessel's actions may be semi-autonomous and may carry out the actions based on pre-programmed commands and routes, or the vessel may be controlled remotely by a user on the beach using, for example, a user device executing certain software.

Figure 1A:
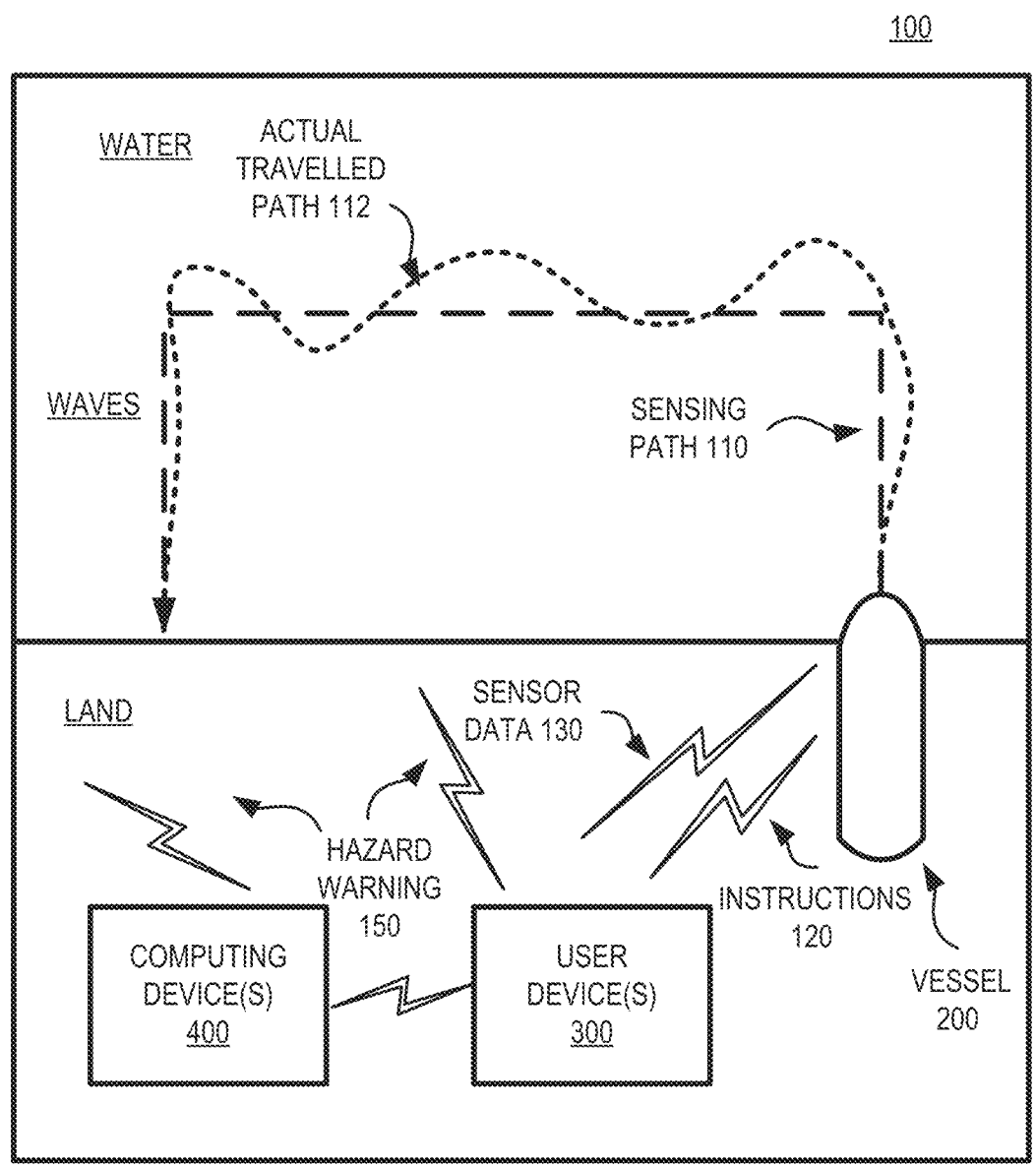
FIGS. 1A-1C illustrate examples of an environment in which systems and/or methods described herein may be implemented according to certain embodiments.
Figure 1B:
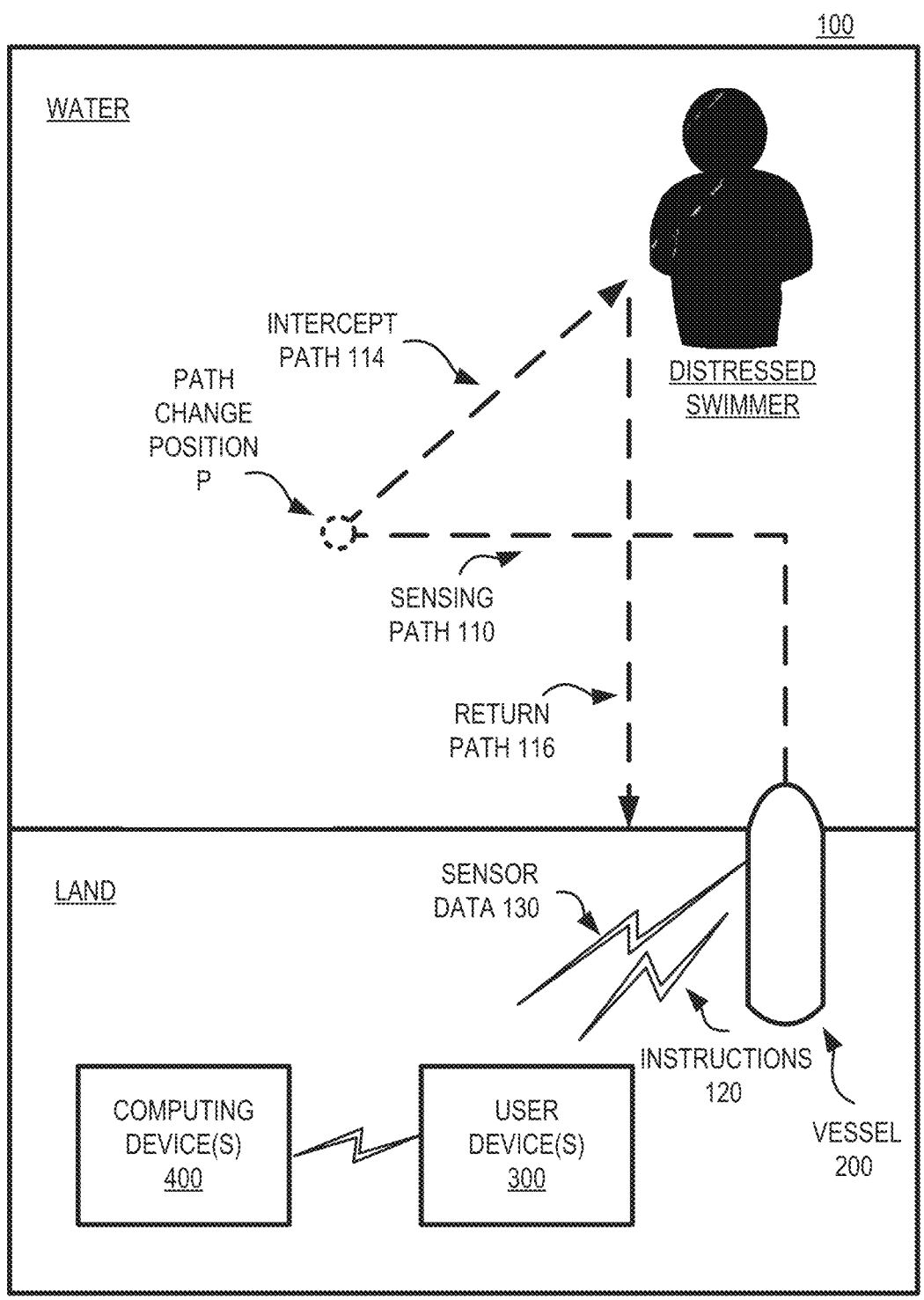
Figure 1C:
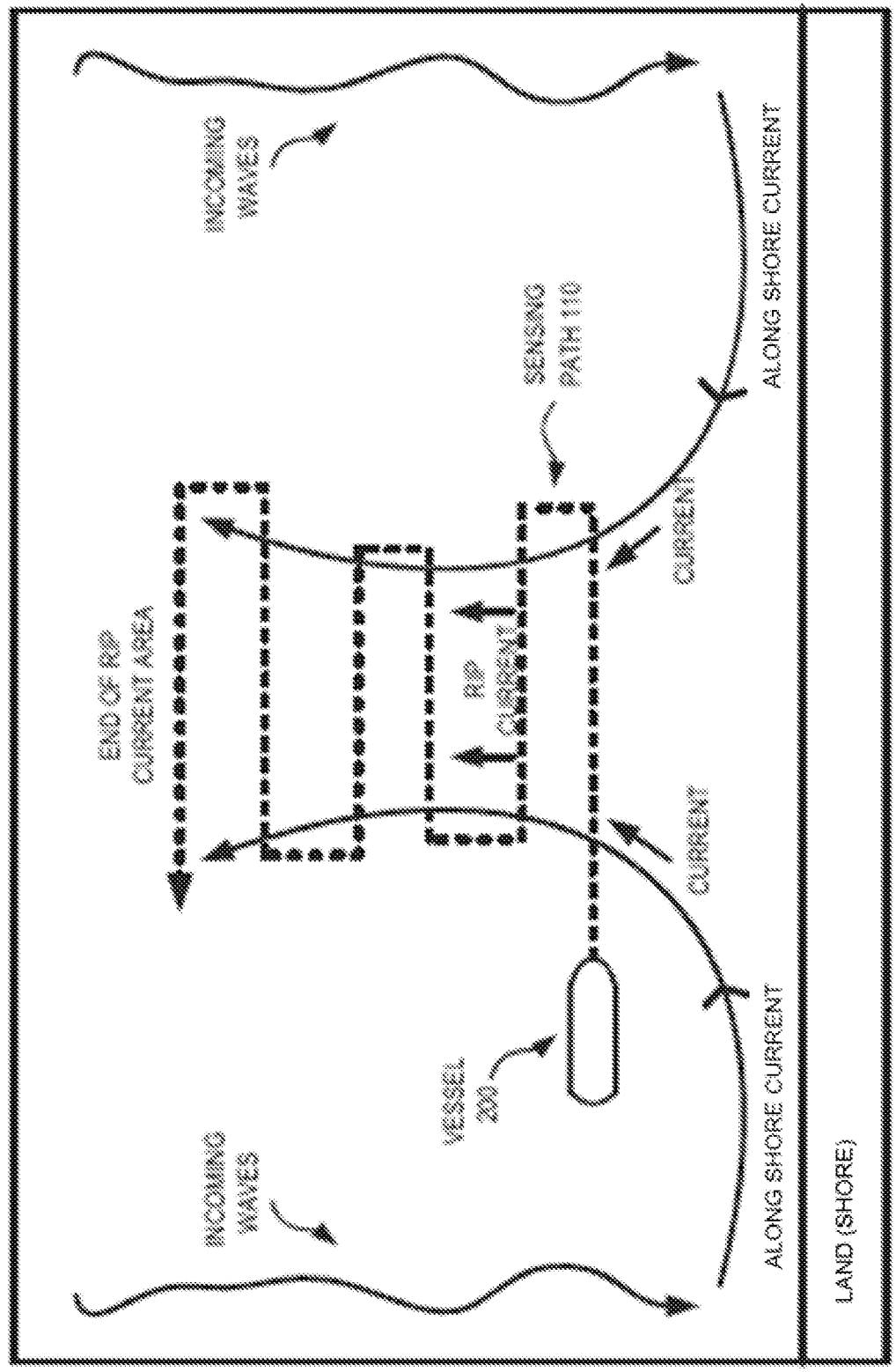

FIGS. 1A-1C show examples of an environment 100 in which systems and/or methods described herein may be implemented. Referring to FIG. 1A, the environment 100 may include a vessel 200 that may be relatively compact and light-weight to be approximately a size of a surf board, such that the vessel 200 may be carried or otherwise used by a user to be positioned within the water. The vessel 200 may be programmed to travel along a sensing path 110 within the water, such as along a shoreline where the water meets land. As described in greater detail below, the vessel 200 may include controlled propulsion system that provides a driving force to move the vessel 200 along the sensing path 110. The vessel 200 may further communicate wirelessly with one or more of a local user device 300 (such as a remote control, smart phone, or a tablet) and/or a remote computing device 400, to receive instructions 120 to define the sensing path or other otherwise control the propulsion system or other components of the vessel 200.

In certain embodiments, the vessel 200 may function to provide a rip current identification, characterization, alert, and distressed swimmer assistance system, water quality measurement and alert system, and beach dangers alert system. To provide these and other functions, the vessel 200 (as described below with respect to FIGS. 2 and 3) may include multiple thrusters; various motion, navigation, flow, and depth sensors; an acoustic transponder for distance estimation and swimmer or underwater obstacle detection; a radio-activated micro controller; a vehicle-borne radio receiver/transmitter; a vehicle-mounted video camera; a vehicle-mounted infrared camera; data recorders; vehicle identification lights, audio transmitters; and visual and audio alerting notification and communication with distressed swimmers; etc.

For example, while the vessel 200 travels along the intended sensing path 110, sensors on the vessel 200 may detect various conditions in the water along that path 110. In another example the vessel 200 may attempt to travel along the sensing path 110, but forces in the water (e.g., various waves or currents) may move the vessel 200 from the sensing path 110 and to an actual travelled path 112, and the vessel 200 may indirectly detect various attributes of the currents based on a difference between the intended sensing path 110 and the actual travelled path 112.

The vessel 200 may include a radio transmitter/receiver to receive instructions 120 from the user device 300 and/or the computing device 400. For example, the user device 300 may provide an interface to receive inputs from a user defining the sensing path 110 for the vessel 200, and the user device 300 may forward instructions 120 to the vessel with information identifying the sensing path 110. The user device 300 may also receive sensor data 130 collected by the vessel 200 while travelling in the water. To communicate with the vessel 200, the user device 300 may include a shore-based radio transmitter/receiver, and may correspond to a shore-based smart device with a graphical touch interface for control of the vessel 200 and for swimmer observation. The computing device 400 may provide visual data analysis and plotting software, map overlays for data visualization, and links to web-based software for issuing beach alerts. The system may also include instantaneous visual and audio alerting capability, as described below.

The vessel 200 may collect various sensor data 130 while travelling along the sensing path 110. For example, the vessel 200 may include a position sensor and an accelerometer to identify its position and movement. The vessel 200 may also collect data regarding a status of the propulsion system at various times, such as the amount forward thrust applied by each of the thrusters. Furthermore, the vessel 200 may include one or more flow meters to measures currents in different directions and at different positions along the sensing path, such as to measure currents moving toward or away from (e.g., substantially orthogonal to) the shore. In another example, the vessel 200 may include one or more sensors that detect attributes of the water, such as temperature, specific gravity, salinity, or a presence of compounds at various different positions along the sensing path.

The vessel 200 may store the sensor data 130 for subsequent access, such as after retrieval of the vessel 200 by a user, or may wirelessly forward the sensor data 130 to the user device 300 and/or the remote computing device 400 while travelling along the sensing path. For instance, the vessel 200 may collect and wirelessly transmit the sensor data 130 in real time, along with data identifying corresponding locations of the vessel 200 when different sensor data 130 is collected.

The sensor data 130 may be processed to identify events, such as potentially dangerous conditions. For example, the sensor data 130 may be analyzed to identify potentially unsafe water movement, such as rip currents moving away from land, along portions of the sensing path 110 to determine the locations of the dangerous conditions. In another example, the sensor data 130 may be analyzed to determine whether undesirable contaminants are present in the water. The sensor data 130 may identify, for example, the locations and physical characteristics of each rip current, the water quality measurements, the vehicle dynamic state, and the tidal conditions. When unsafe or otherwise undesirable conditions are identified, the vessel 200 may output a warning 150, such as an audio or visual notification within the environment 100, such as to a swimmer in the water or a user on the beach.

Additionally, the user device 300 and/or the computing device 400 may output a warning message 150 to other devices, such as to other user devices. In one example, when the user device 300 determines that dangerous values (e.g., values outside of a particular range of values or higher that a threshold value) are present in the sensor data 130, the user device 300 may forward information regarding an associated hazardous condition to the computing device 400, and the computing device 400 may broadcast the warning 150 to alert beach safety personnel (e.g., to associated user devices 300) to take appropriate actions, such as placing signs notifying swimmers of dangers or closing unsafe portions of the shore. The coordinates of rip currents may be included in the broadcast warnings 150, as well as the coordinates of harmful contaminants.

Additionally, this information identifying the dangerous conditions may be provided to users via a website provided through or generated by, by example, the computing device 400. The website may plot the coordinates onto a local beach map so users may see exactly where the dangerous conditions are present at that time of sensing by the vessel 200 (see FIG. 4). The local beach map may be generated based on the sensor data or may be obtained through another source, such as through satellite images from a third party. This web-based information and alerts website may enable users to assess the immediate swimming conditions at a beach. Also, alerting software may be provided to issue alerts to the website of dangerous beach conditions such as nearby lightning strikes, imminent lightning strikes, water quality conditions, and rip currents and their locations as a function of time and tide. The alerting software may also identify location where more than a threshold number of swimmers are rescued from the water. These alerts may also be issued to emergency personnel on a graphical touch screen beach safety system interface.

Analysis software may also be included in the system to alert users of recent rip current activity and rip locations at beaches of interest during a prescribed period, such as a recent number of days and also the water quality hazards existing at those beaches during the prescribed period. In one example, the alerts may be superimposed on maps (see FIG. 4) of each particular beach for which data has been measured to alert users of the currently existing dangerous swimming locations and any dangerous swimming locations that were previously identified during a prescribed timer period, such as during a recent week.

Referring now to FIG. 1B, the vessel 200 may selectively leave the initial sensing path 110 at a position P to travel along a different intercept path 114 toward a swimmer. For example, the vessel 200 may leave the sensing path 110 and move along the intercept path 114 toward the swimmer based on receiving an instruction 120 from the user device 300 and/or the computing device 400 to perform swimmer assistance. In another example, the vessel 200 may automatically move toward the swimmer when sensor data 130 associated with a rip current or other dangerous water condition is collected. Additionally, the vessel 200 may move toward the swimmer based on detecting an indication of distress by the swimmer, such as detecting an audible request for assistance (e.g., detecting an audio output of certain volume, pitch, or duration by the swimmer; or a verbal output from the swimmer or other persons which include one or more terms associated with a request for help), other audio indication of distress (e.g., detecting sounds associated with the swimmer splashing or otherwise struggling to swim) or a visual indication of certain motions associated with a distressed swimmer (e.g., arm waving).

The vessel 200 may automatically determine a location of the swimmer based on detected sensor data, such as processing captured images to detect the swimmer or processing audio data to identify a direction and distance of the swimmer relative to the vessel 200. The vessel 200 may move along the intercept path 114 to be positioned close to the swimmer (e.g., within detection range of an output device on the vessel 200) to provide an audio and/or visual warning of the dangerous condition. Furthermore, the vessel may hold a position near the swimmer to provide an indication of the swimmer's location to safety officials. In other situations, the vessel 200 may move on the intercept path 114 to contact the swimmer. For example, the vessel 200 may move close enough to allow the swimmer to hold on to and use the buoyancy of the vessel 200.

Additionally, the vessel 200 may, after reaching the swimmer, activate the propulsion system to help move the swimmer toward land along a return path 116. For example, the vessel 200 may identify, as the return path 116, a fastest route to land or may process the sensor data 130 to determine a less direct return path that avoids dangerous conditions (e.g., rip tides, contaminants, etc.), and may activate the propulsion system to move the swimmer along the determined return path 116.

In one configuration, the vessel 200 (by itself or in combination with one or more of the user device 300 or computing device 400) and may process the sensor data 130 to identify a presence and location of the swimmer within the environment 100. For example, the vessel 200 may include an image sensor (e.g., a camera) and a heat sensor (e.g., an infrared camera) and may process captured images to identify a presence and a location of the swimmer In another example, the vessel 200 may include an audio sensor that detects noises from the swimmer, such as verbal outputs or splashing noises associated with swimming.

In an example shown in FIG. 1C, the vessel 200 may change its sensing path 110 when a hazardous condition is identified. For example, when a rip current is identified, the vessel 200 may move such that sensing path 110 includes turning around to repeatedly travelling through the rip current to determine the boundaries of the rip current area. As shown in FIG. 1C, the vessel may travel substantially parallel to the shore within a rip current area, and when sensors of the vessel 200 no longer detect the rip current (e.g., the outward current is less than a threshold value), the vessel 200 may turn to position itself a particular distance (e.g., 10 meters) increasingly further from the shore and then travel back through the rip current area along another path segment that that is also substantially parallel to the shore. In this way, the vessel 200 may determine respective widths and forces of the rip current at different distances from the shore. The vessel 200 may continue traversing different portions of the rip current until an end of the rip current is detected, such that the vessel 200 can detect how far out from the shore the rip current extends. Thus, the vessel may map dimensions of the rip current and respective current velocities in different locations.

While described with respect to a rip current, the vessel 200 may also dynamically modify the sensing path 110 when any type of hazardous condition is detected. For example, if the vessel 200 detects contamination within a traversed region the water, the vessel 200 may turn to further evaluate adjacent regions of the water to determine other areas affected by the contamination. Furthermore, the vessel 200 may, as previously described, travel along parallel path segments at different distances from the shore, but in another example, the vessel 200 may travel in a particular pattern around an location where a hazard is detected, such as to travel in an outward spiral from that location to sense conditions around that location.

While various components in the environment 100 have been described, it should be appreciated that the environment 100 may include additional, fewer, or different components than those depicted in FIGS. 1A, 1B, and 1C. For example, environment 100 may include additional devices collecting sensor information, identifying conditions within environment 100, or to provide notifications of those conditions, such as an environmental sensor positioned to detect conditions, such as light levels, temperature, wind speeds and directions, etc. Furthermore, the components depicted in FIGS. 1A-1C may perform additional, fewer, or different functions. For example, the vessel 200 may transmit a message requesting assistance from an emergency service provider when a swimmer is holding onto the vessel 200.

Figure 2A:
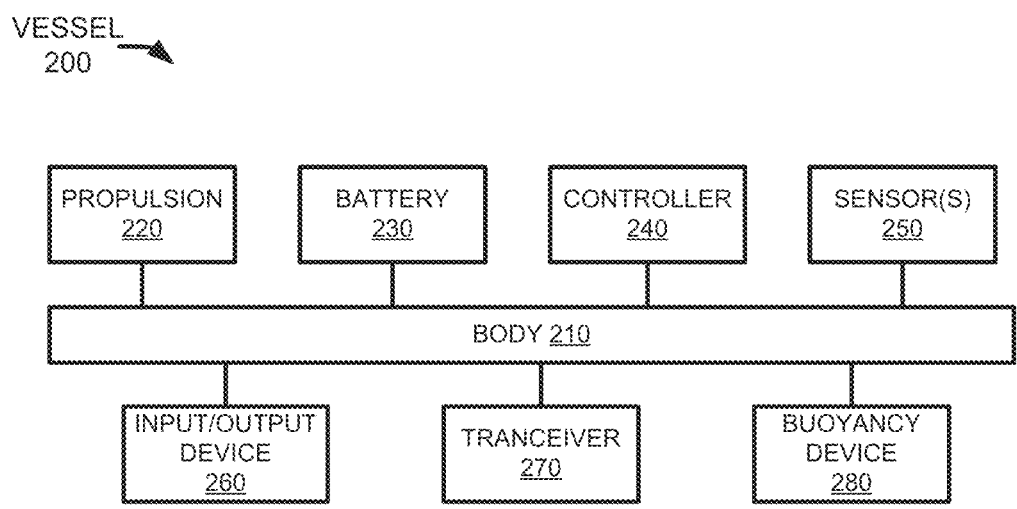

FIGS. 2A and 2B show examples of components that may be included in the vessel 200. For example, the vessel 200 may include a body 210, a propulsion system 220, a battery 230, a controller 240, one or more sensors 250, a user input/output (I/O) device 260, a transceiver 270, and buoyancy device 280.

As shown in FIG. 2B, the body (or hull) 210 may include a board 211 that is substantially planar to provide an upper surface (or deck) 212 to receive the other components of the vessel 200. For example, a water resistant enclosure 213 to receive the other components may be mounted on the top surface 212. One or more fins 214 that function as a stabilizing rudder may be coupled to or integrally formed on a bottom surface 215 at a rear (or tail) 216 of the board 211. The board 211 may include a front (or nose) 217 that is pointed or rounded such that the board 211 gradually increases in width away from the front 217 so that the board 211 has a more streamlined shape to reduce a drag of the board 211 within water. The front 217 and/or the tail 216 may incline upwards, relative to a center portion of the board supporting the enclosure 213, to increase a maneuverability of the board 211. The board 211 may be constructed of materials providing positive buoyancy to float in water. For example, the board 211 may have a polyurethane or polystyrene foam core to provide buoyancy and may be covered with fiberglass, polyester, or epoxy to provide rigidity.

In one example shown in FIG. 2B, the board 211 may correspond to a commercially available surfboard to be easily handled by a user. A size of the board 211 and a position of the board 211 in the water may correspond to a swimmer such that currents in the water, such as a rip current, may affect a movement and/or position of the vessel 200 similarly to a swimmer. For example, the board 211 may be 1.5-3.0 meters in length, 0.5-1 meters in width, 7-12 centimeter in thickness, and 2-6 kilograms in mass, but other sized boards 211 may be used in the vessel 200.

A surfboard may be modified for use as the board 211. For example, a conventional 3-fin arrangement for a surfboard may be changed to include only a single centerline fin 214. For example, side fins may be removed since the side fins may contribute unwanted drag and may create unwanted directional forces that may limit the ability of propulsion system 220 to turn the board 211. Additionally, a standard centerline fin from a surfboard may be replaced with a relatively larger fin 214 having an increased area in order to create more side force and a larger yaw moment when the vessel 200 enters a rip current.

Additionally, the body 210 may include holes (not shown) drilled through the board 211. For example, the thruster motor wires may be passed into one of the holes from beneath the board to the upper surface where they can be led through attachments to the enclosure 213. An aft hole may be drilled to support a pole-mount for a searchlight. Several holes may be drilled at a forward section of the body 210 and electrical wires may be passed through these forward holes for a water velocity sensors and a water contaminants sensor (described below). Furthermore, four additional holes may be drilled, two on each side of a centerline of the board, for installation of a swimmer flotation assistance system. Furthermore, a surfboard may be modified to include Velcro® segments (or other fasteners which are attached to the upper surfaces in several locations to secure the enclosure 213, the infrared camera/phone mount, a camera mount, and the swimmer assistance flotation system. The body 210 may further include mounting hardware and thruster mount holes that are drilled to receive the two or more thruster motors on the bottom surface of the board.

Continuing with FIG. 2A, the propulsion system 220 may provide a driving force to propel the vessel through the water. As shown in FIG. 2B, the propulsion system 220 may include two or more thrusters (or propellers) 221 mounted on the bottom surface (or underside) 215 of the board 211. Thrusters 221 may be mounted on the underside of the vessel 200 to provide the propulsion and control forces for maneuvering. For example, one thruster 221 (e.g., a right or starboard thruster 221) may be mounted to one side of a centerline extending along a lengthwise direction of the body 210, and another thruster 221 (e.g., a left or port thruster 221) may be mounted to another side of the centerline. The two or more of the thrusters 221 may combine to enable surge and yaw motion of the vessel 200. Control over the thrusters 221 may be managed either by the operator through remote commands, or by the controller 240 that forms command signals based on sensor data collected by sensors 250.

In one example, the vessel 200 may operate at relative slow forward speeds (that the user can control remotely) when traveling along sensing path 110 to collect sensor data to detect the dangerous conditions or at relatively high speeds when in a swimmer-assist mode to assist the swimmer. The ability to independently control speed and rotational direction on each thruster 221 enables precise control of the vessel 200 when maneuvering to assist distressed swimmers. As described below, this precise control may be supported by visual feed on a graphical interface screen of the user device 300 from the video and thermal imaging cameras on the vessel 200 to assist emergency personnel in controlling the vessel 200 toward the swimmer.

The thrusters 221 may include an electronic or hydraulic motor that is coupled to a propeller, and the motor may be activated to rotate the propeller to provide a driving force to propel or turn the vessel 200. In another configuration (not shown), the propeller and motors may be separated, such as to position the propellers on the bottom surface 215 and the motors on another section of the body 210, and connecting the motors and propellers via one or more shafts to forward a driving force from the motors. The thrusters 221 may be mounted at opposite sides of the board 211 and in front of the fin 214.

In one example, the thrusters 221 may include modified versions of a T200 thruster sold by Blue Robotics Corp. of Torrance, Calif. For example, the mounts provided with T200 thrusters may be modified to provide greater holding force to the bottom surface of the body 210, such as to drill larger diameter holes in the standard mount and to use larger diameter and longer screws.

In other examples, the propulsion system 220 may include additional or other components that differ from the thrusters 221. For example, the propulsion system 220 may include a fan positioned above water to generate an air flow to move the vessel along the surface of water.

Continuing with FIG. 2A, the vessel 200 may include one or more batteries 230. The batteries 230 may store power to drive electronic components of the vessel 200, such as the propulsion system 220, the controller 240, the sensors 250, the user input/output device 260, and the transceiver 270. In one configuration discussed below, the batteries 230 may provide power solely to the propulsion system 220, and other components of the vessel, such as the transceiver 270, may include a separate battery or other power source.

The batteries may be positioned in the enclosure 213. In one of the example, the vessel 200 may use a separate battery 230 for each of the two thrusters 221 shown in FIG. 3. The batteries 230 may be 14.8 volt, 256 watt-hr, rechargeable LI ion battery packs from Blue Robotics. In one example, one or more extension wires may be spliced from the motors of the thruster 221 to the electronics and controls within the enclosure 213. Watertight connectors may be installed in the enclosure 213 to pass the propulsion wires connected to the battery 230, and the wires may be attached with a Velcro® surface to the bottom on the enclosure 213 to prevent movement.

In other examples, the battery 230 may be excluded from the vessel 200. For example, electrical power to drive the other components of the vessel 200 may be generated by a motor, such as a motor included in the propulsion system 220, or by another power source, such as a solar power cell.

Continuing with FIG. 2, the controller (or microcontroller) 240 may selectively activate the propulsion system 220 to move the vessel 200 along the sensing path. For example, the controller 240 may receive an input via the user input/output device 260 that defines the sensing path, and may further receive information from the sensors 250 to identify a geographic location of the vessel 200. The controller 240 may then selectively activate the propulsion system 220 to move the vessel 200 from the detected location to a location along the sensing path.

The controller 240 may be a processor or circuit board that executes stored instructions. The controller 240 may receive various inputs, such as data identifying a present input power supplied to the propulsion system 220 and sensor readings from the sensors 250. The circuit board may then selectively modify the input power to the propulsion system 220 based on one or more sensor readings. For example, the power level to a thruster 221 may be adjusted based on a comparison of a detected actual position of the vessel 200 and the sensor path 110, such as to move the vessel toward a portion of the path 110 while the vessel 200 is travelling in the water.

For example, the controller 240 may include a microcontroller board which is used to facilitate and process wireless communication, sensor integration, and thruster actuation. This controller 240 may be set by a user of the user device 300 or the computing device 400 to enable manual or autonomous control of the vessel 200 via the multiple thrusters 221. Control over these thrusters 221 permits forward, reverse, right and left forward turns, and right and left backward turns, at multiple forward and reverse speeds.

As previously described, the vessel 200 may include one or more sensors 250 to collect information while the vessel 200 is travelling through the water. As described herein, the sensors 250 may determine an instantaneous location, instantaneous heading data, and provide instantaneous vehicle orientation stability information. Feedback from these sensors 250 to may be used in vehicle maneuvering control algorithms to enables path tracking along sensing path 110 and to better ensure stability of the vessel 200. Additionally, data from these sensors 250 may be wirelessly transmitted to the user device 300 for monitoring purposes and to develop a track and heading history for post-mission analysis.

For example, the sensor 250 may include a global positioning system (GPS) or other position sensor (e.g., a sensor to detect a position of the vessel 200 based on relative signal strength from different communications antennas) to detect a location of the vessel 200. The sensors 250 may include one or more of a gyroscope, accelerometer, a compass, or an altimeter to measure information regarding a heading and orientation of the vessel 200, such as its roll, pitch, or yaw.

Additionally, the sensor 250 may include an acoustic transponder that outputs an audio output and measures a delay before sensing an echo to measure a depth of the water. Furthermore, a flow meter, such as a paddle wheel flow sensors may be used for water current velocity measurements. Multiple flow meters may be used to measure water current velocity is different directions relative to a traveling direction of the vessel 200.

In one example, the sensors 250 may determine water quality measurements, such as acidity (or pH), turbidity (or light scattering due to dissolved contaminants), dissolved oxygen (DO), oxidation-reduction potential (ORP), conductivity (salinity), turbidity, temperature, and a concentration of certain dissolved ions. The water quality measurements may be compared to threshold values to determine a presence of harmful contaminants or organisms. For example, certain dissolved oxygen levels may indicate a presence of microorganisms from sewage, urban, or agriculture runoff or discharge from factories, certain ORP measurements may indicate a presence of potentially hazardous microorganisms, such as *E. coli, salmonella,* or *listeria*. Additionally, certain pH or DO values may indicate a presence of certain potentially harmful chemicals.

The sensors 250 may further include an image sensor, such as a GoPro® video camera. The vessel 200 may also include a continuous beam lamp that outputs light, and the image sensor may measure the reflection from the continuous beam lamp to gain situational awareness around the vessel 200, such as to avoid floating debris, buoys, channel markers, jetties, pier pilings, etc. In another example, the image sensor may be used when locating distressed swimmers, such as to identify a shape, color, or movement associated with a swimmer. The vessel 200 may also include an additional sensor 250 to locate and maneuver alongside a distressed swimmer. For example, for identifying a near-surface, partially submerged swimmers in daytime or surfaced swimmers in darkness, the vessel 200 may include a forward looking infrared (FLIR) thermal imager, such as a thermographic camera that senses infrared radiation to detect body heat from the swimmer. For example, certain video cameras may include sensors that also detect infrared radiation from the swimmer.

As previously described, the vessel 200 may include the user input/output (I/O) device 260 to provide an interface to receive user input and/or to output data to a user. The user I/O device 260 may be used to define the sensing path and may present sensor data 130 collected along the path. For example, the user I/O device 260 may include a keyboard, touch screen, mouse, or other input device. Additionally, the user I/O device 260 may include a display, lights to present a visual output, and a speaker to provide an audio output.

In one configuration, the vessel 200 may be remotely controlled via the local user device 300 and/or the remote computing device 400, such as using radio signals exchanged via transceiver 270. For example, control software that is written for the vessel 200 may be installed on the local user device 300 (e.g., on a laptop or tablet). The control software may allow a user to select among different speed control settings for each thruster 221. Each thruster 221 may be independently controlled so, for example, a user may choose ahead maximum thrust for one thruster 221 and reverse speed maximum thrust for the second thruster 221 for a tightest turn possible in a rotational direction. Thus, the control software implemented through the user device 300 enables a user to select among a great many combinations to achieve precise speed and heading control. As described below, when the user device 300 includes a touch screen, such as a tablet or smart phone, the software may enable independent fingertip control of the thrust magnitude and direction through 360° for each thruster 221.

Additionally, the user I/O device 260 may include an audio speaker to output sound. For example, the audio speaker may output an audio warning when dangerous conditions are identified. Additionally, the audio speaker may output instructions and status indications to a distressed swimmer, such as instructions to move toward and hold onto the vessel 200. The instructions outputted through the speaker of the user I/O device 260 may be received via beach waterproof 2-way radios to communicate instructions from a user at the beach (e.g., a lifeguard) to the swimmer in the water.

The transceiver 270 may exchange wireless signals between the vessel 200 and the local user device 300, the remote computing device 400, another device such as a weather sensor, or an intermediate device providing access to a network, such as a base station tower. In one configuration, the vessel 200 may use an XBeePro 900 xStream compatible (XSC) radio frequency and antenna, which has a range of approximately 1 mile.

The power for the transceiver 270 may be provided by batteries that are separate from the batteries 230 that drive the propulsion system 220. For example, these separate batteries for the transceiver 270 may be included in a case mounted on one of the walls of the enclosure 213. These batteries may also provide power to the controller 240. If one of the propulsion motors in propulsion system 220 fails, such as being over-torqued due to debris ingested by an associated propeller, one or more of the batteries 230 powering that propulsion motor may be exhausted. Nevertheless, the remaining thruster 221 may continue to be driven by a separate battery 230, and the controller 240 that are powered by the separate batteries may continue to provide commands to the remaining thruster 221. Similarly, the transceiver 270 may continue to receive and provide instructions to the controller 240 when driven by a separate battery, even when the battery 230 for one of the thrusters 221 is exhausted or damaged.

Continuing with FIG. 2A, the vessel 200 may further include the buoyancy device 280. The buoyancy device 280 may include a safety device that may be accessed by distress swimmer, such as a life jacket or other a personal flotation device that may be removably coupled to a vessel 200. Alternatively or additionally, the buoyancy device 280 may include foam or other lighter-than-water material mounted to the body 210 to increase the buoyancy of the vessel 200 such that vessel 200, when held by the swimmer, can support the swimmer in the water.

In certain configurations, the buoyancy device 280 may be selectively inflated when providing assistance to a distressed swimmer. For example, the controller 250 may automatically inflate the buoyancy device 280 when the vessel 200 moves to provide assistance to a distressed swimmer In another example, the buoyancy device 280 may be inflated based on receiving a user input, such as the swimmer contacting a floating nylon cord coupled to the buoyancy device 280 to activate an inflation mechanism, the sensor 250 detecting an audio request by the swimmer, or a user on the beach providing a particular instruction through the user device 300. In one example, separate floating nylon cords may be provided on each side of the vessel 200. When the swimmer pulls on the floating nylon cord, the buoyancy device 280 may deploy from a topside surface of the vessel 200. In one implementation, buoyancy device 280 may exert force downward near the centerline of the vessel 200 while supporting the swimmer with the buoyancy device 280, thus reducing the possibility of large roll motions and the swimmer capsizing the vessel 200 such that the swimmer may remain afloat by holding onto the vessel 200 until rescue personnel can reach the swimmer.

In certain implementations, the vessel 200 may include two or more buoyancy devices 280. For example, buoyancy devices 280 may provide flotation assistance capability on both port and starboard sides of the board 211 that could be used simultaneously. When the vessel 200 maneuvers to provide assistance to two distressed swimmers simultaneously, each swimmer may grab a respective one of the buoyancy devices 280. For example, a parent assisting a child or a rescuer helping another swimmer in a rip current may, herself, be caught in the rip current and require assistance. In such a case, the distressed swimmers may be close together and may receive assistance from the vessel 200 at the same time. For example, the vessel 200 may provide audio instructions telling the swimmer to each grab onto the buoyancy device 280 on either side of the board. Since the primary force for each of the buoyancy devices 280 may be directed downward along the centerline, the board 211 will not capsize, and both swimmers could hang on to the board 211 until rescue personnel reach them.

While various components of the vessel 200 have been described, it should be appreciated that the vessel 200 may include additional, fewer, or different components than those depicted in FIGS. 2A and 2B. For example, a vessel 200 may omit one or more of the sensors 250 and, instead, may collect data, such as weather data, collected by other devices by communicating with the other device via transceiver 270. Furthermore, the components depicted in FIGS. 2A and 2B may perform additional, fewer, or different functions. For example, while the fin 214 is described as being fixed to stabilize a motion of the vessel 200 in a particular direction and steering of the vessel 200 is described as performed by varying the operation of the thrusters 221, the fins may be selectively rotated relative to the body 210 by a motor (not shown) to function as a movable rudder to direct a movement direction for the vessel 200.

Figure 3:
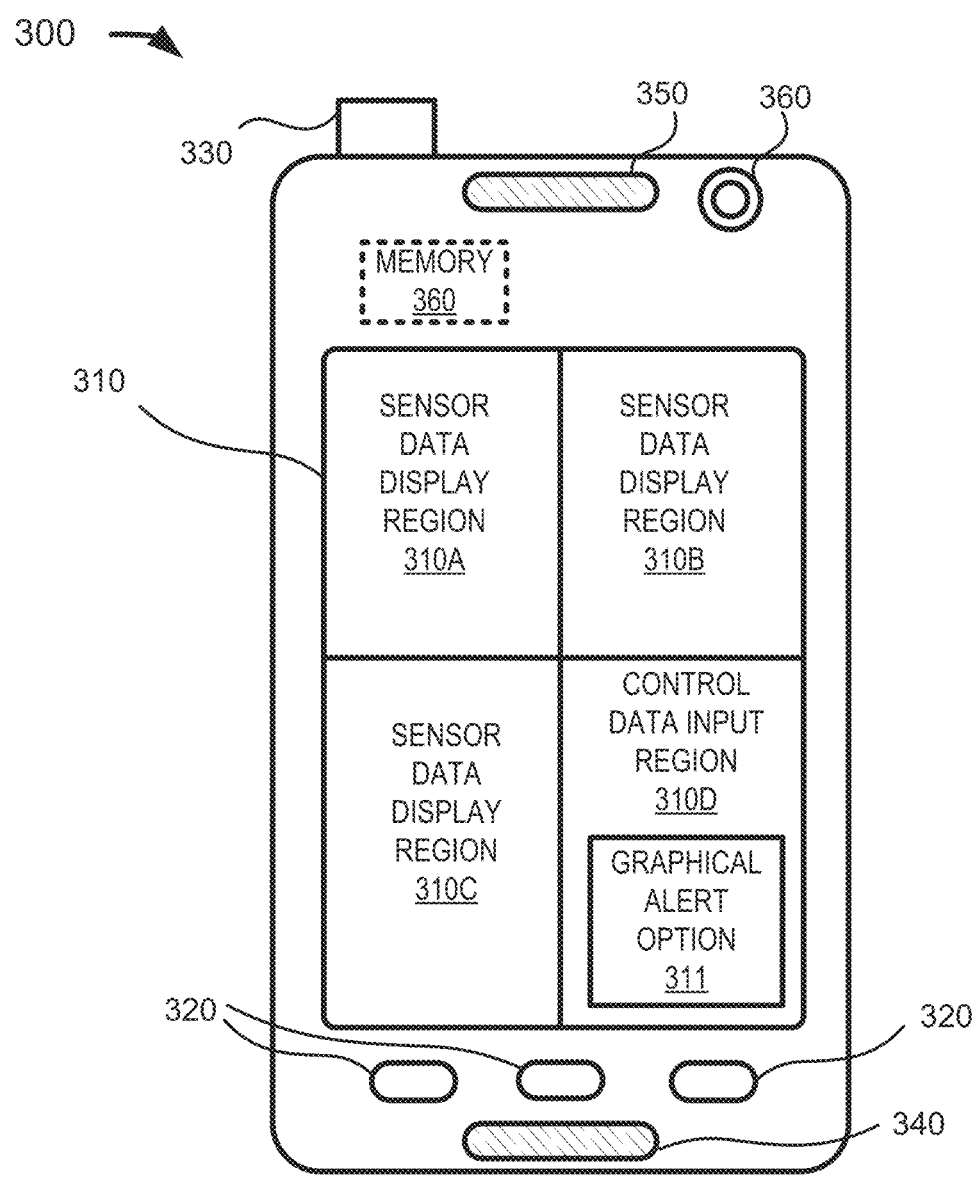
FIG. 3 illustrates an example of a user device used in the environment of FIGS. 1A-1C according to certain embodiments.

Referring now to FIG. 3, the user device 300 may include a display 310 to present information associated with software executed on the user device 300 to control the vessel 200 and to present the sensor data 130 and results from processing the sensor data 130. The user device 300 may also include an input device 320, and the software may enable a selection of thrust magnitude and direction, incrementally through 360 degrees, independently for each thruster 221 through the input device 320. In one implementation, the display 310 and the input device 320 may be integrated as a touch screen. Entered commands may be transmitted by the vessel 200 through a device transceiver 330, such as a universal serial bus radio frequency (USB RF) transmitter on the user device 300 to the transceiver 270 on the vessel 200. The user device 300 may further include, for example, a microphone 340, a speaker 350, and a camera 360.

As described herein, the display 310 may provide an innovative user interface to enable a user to more easily control the vessel 200 and to receive and present sensor data collected by the vessel 200. In one configuration, the display 310 may present a video feed from a camera or other sensor 250 on the vessel 200 substantially in real time. For example, the camera may be oriented toward a front or nose of the vessel 200 to provide feedback regarding a current movement direction of the vessel 200 to assist in directing the vessel 200 to an intended location or to move the vessel along an intended track.

In one configuration, the display 310 may be divided into four separate quadrants. For example, the user may select what content from the transmitting sensors 250 to display in three of the quadrants (depicted as sensor data display regions 310A-310C), and a fourth quadrant (depicted as control data input region 310D) may be reserved for receiving an input to control the thrusters 221. As previously described, the display 310 may present various data regarding the state of the vessel 200 (such as a heading, a speed, accelerations), measured location of the vessel 200 (GPS coordinates), rip current velocity, a video feed from the camera showing a swimmer as the vessel 200 approaches, thermal image, water quality data, water depth, as the user desires, in the sensor data display regions 310A-310C.

In certain configurations, one or more sensor data display regions 310A-310C of the display 310 may automatically present certain information, such as a video feed from the vessel 200, when the user device 300 determines that a swimmer is in distress (e.g., struggling to swim or performing a move such as arm waving that indicates a request for assistance), or when an analysis of audio data collected by the vessel indicates that the swimmer is yelling for assistance.

Similarly, a portion (e.g., control data input region 310D) of the display 310 may automatically display an interface to control a movement of the vessel 200 when the distressed swimmer is detected so that the vessel 200 may be navigated remotely, via the user device 300, toward the swimmer using turning and throttle commands. In one configuration, the user device 300 may initially control the vessel 200 to automatically move toward the swimmer at a maximum thrust on all thrusters 221 until the vessel 200 is positioned near (e.g., within a threshold distance of) the swimmer. The interface in display 310 (e.g., one of the sensor data display regions 310A-310C) may then automatically present a video feed of a location associated with the swimmer or other sensor data and enable a user to slowly maneuver the vessel 200 alongside the swimmer in a very precise manner.

Furthermore, the display 310 may display a graphical alert option 311 that allows a user to broadcast an alert when dangerous conditions, such as a rip current, are measured. In one implementation, the display 310 may present the alert option 311 to broadcast the alert only when a dangerous condition is detected based on movement and sensor data collection by the vessel 200. For example, a selection of the graphical alert option 311 may cause an alert to be forwarded to another user device 300 for a safety official, such as a lifeguard, at a location associated with the dangerous condition. In another example (not shown), the display 310 may display multiple alert options 411, such as a first alert option to forward an alert to a user device 300 of a safety official and a second alert option 311 to broadcast the alert to various other user devices 300, such as user devices 300 at or near (e.g., within a threshold distance of) a beach associated with the dangerous condition.

In one implementation, the device transceiver 330, the microphone 340, the speaker 350, and the camera 360 may combine with components of the vessel 200 to form a two-way radio to enable communications between the swimmer and the user of the user device 300. For example, the microphone 340 may record and capture instructions from a user of the user device, and the device transceiver 330 may forward the captured instructions to the vessel 200 to instruct the swimmer, such as to instruct the swimmer to engage the buoyancy device 280 by pulling on a floating nylon cord. Similarly, an audio sensor 250 may capture audio from the swimmer and forward the captured audio to the user device to be replayed to the user. In one configuration, the two-way radio may be automatically activated when a distressed swimmer is identified, or the two-way radio may be activated when a particular user input is applied to the vessel 200 by the swimmer or by the user to the user device 300.

If the swimmer cannot be located on the video feed from the camera on the vessel 200 at a last known location in the water, the user may input a control instruction through the user device 300 to activate an IR camera or other sensor 250 on the vessel 200 to capture thermal images at the swimmer's last known location. While capturing the thermal images, the user device 300 may further control the vessel 200 to travel in a preset search pattern path around the swimmer's last known location, such as to travel in a circle around the last known location or to in an outwardly extending spiral. The thermal images may be continuously transmitted to the user device 300, and the user device 300 may process captured the thermal images to locate a thermal signature associated with the swimmer. The user device 300 may then forward corresponding geographic location of the swimmer's thermal signature to rescue personnel. The user device 300 may further instruct the vessel 200 to activate a light output on the vessel 200 and to hover in the area of the thermal signature until the rescue personnel arrive.

Continuing with FIG. 3, the user device 300 may include a memory 360 to store time histories of received sensor data 130 as data files for post-mission analysis, such as archiving the sensor data 130 as a function of beach, specific location, time of day, state of the tide, and wind magnitude and direction. This data may be analyzed as a component of a beach safety assessment for the conditions existing at that location and time. This data may provide information (GPS coordinates, distance from shore, date time, tidal information) for rips current or other hazardous conditions that have been previously detected at each beach. This data may enable daily measurement surveys to begin at those locations shown or previous days to be the location of rip currents.

In one example, the sensor data 130 from only locations associated with previously measured rip currents or other conditions are evaluated to reduce processing requirements. In another example, the user device 300 directs the vessel 200 to collect sensor data 130 at location associated with previously measured rip currents or other conditions, or the user device 300 may only store data associated with previously measured rip currents or other conditions to minimize storage requirements.

In another example, the user device 300 may determine threshold values to compare to the sensor data 130 based on the previously measured rip currents or other conditions. Thus, data of previous measurements may be used to speed up the process of locating rip currents as the season progresses and data is accumulated at a particular beach. For example, analysis of the collected sensor data may focus on regions where dangerous conditions were previously identified. Furthermore, the threshold values used to identify hazardous conditions may vary between different locations, or even in different portions of a single area.

While various components of the user device 300 have been described, it should be appreciated that the user device 300 may include additional, fewer, or different components than those depicted in FIG. 3. For example, the user device 300 may include a sensor to collect various data, such as weather data, tide, or swimmer data, separately from the vessel 200, or may communicate with another device, not shown, to collect other types of data. Furthermore, the components depicted in FIG. 3 may perform additional, fewer, or different functions. For example, while user device 300 may receive, process, and present sensor data from the vessel 200, the vessel 200 is separately controlled by another device, such as by a wireless remote controller that transmits moving instructions to the vessel 200.

Figure 4:
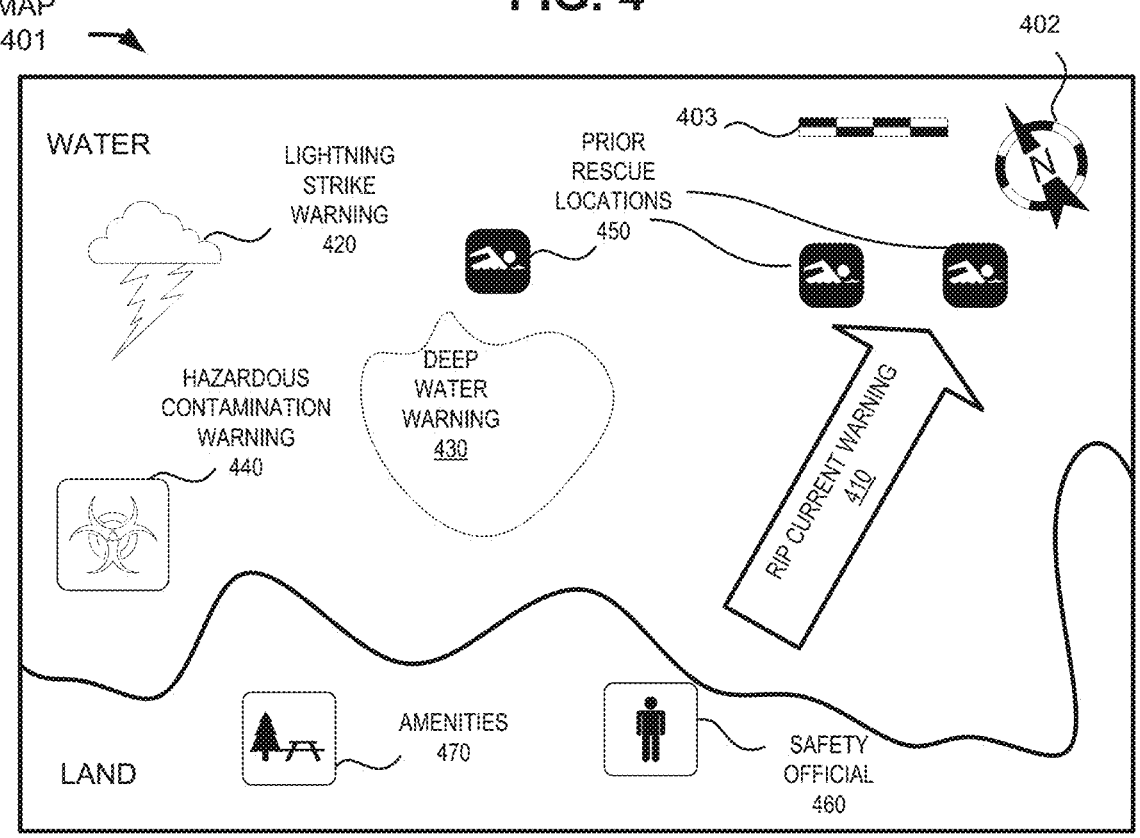
FIG. 4 illustrates an example of a hazardous condition map generated in the environment of FIGS. 1A-1C according to certain embodiments.

FIG. 4 is an example of an alert map 401 that may be generated by the computing device 400 and distributed to various user devices 300, such as user devices 300 of safety officials, subscribers, swimmers located at the beach associated with the alert map, etc. In the example shown in FIG. 4, the alert map 401 may provide an indication of the water and land regions at a location, and may provide indications of a direction 402, and a scale 403 of the alert map. The alert map 401 may further include a visual indication of locations and types of hazardous conditions that are identified by the sensors 250 of the vessel 200. For example, the alert map 401 in FIG. 4 includes a rip current warning 410, a lightning strike warning 420, a deep water warning 430, and a hazardous contamination warning 440. It should be appreciated, however, that these warnings are provided solely for purposes of explanation, and the alert map 401 may identify other types of dangerous conditions. A user may determine safe locations to swim in the water using the alert map 401.

The rip current warning 410 may include a graphical symbol (e.g., an arrow in FIG. 4) providing an indication of a location, width, and direction of a detected rip current. As previously described, the rip current warning 410 may correspond to a region in the water where the vessel 200 detects a current flow away from the land while travelling along a sensing path 110. The rip current warning 410 may also provide an indication of the strength the rip current, such as to present the rip current warning 410 in different colors based on a detected speed or force of the rip current. For example, the color of the rip current warning 410 may correspond to a distance that the vessel is moved by the rip current from the intended sensor path 110 during a time period. The rip current warning 410 may further include information about when the rip current is detected or other sensor data, such as identifying when the vessel 200 is travelling along the sensor path 110. Accordingly, a user may determine visually determine, based on the rip current warning 410, a location, size, flow direction, and force of a rip current so that the user may avoid the rip current.

The lightning strike warning 420 may indicate a location of a lightning strike. For example, the location may correspond to a location along the sensing path 110 where the vessel 200 detected a voltage in the water or where a camera on the vessel 200 identified a lightning strike. The lightning strike warning 420 may also indicate when the lightning strike is detected. The lightning strike warning 420 may also provide an indication of whether the lightning strike is detected by the vessel 200 or is being reported based on data received from another source, such as a weather service or visual observations. A size of the lightning strike warning 420 may identify, for example, a potential area where lightning strikes have occurred and/or are likely to occur to that a user may avoid these areas.

The location of the deep water warning 430 may correspond to a location in the seabed that is deeper than a threshold depth or deeper than surrounding regions by more than a threshold amount. The location of the deep water warning 430 may correspond to a location along the sensing path 110 where a depth sensor 250 on the vessel 200 identifies an unexpected drop-off in the seabed. In another example, the deep water warning 430 may correspond to a location known to be associated with a drop-off in the seabed, such as a channel in the water. In other examples, the deep water warning 430 may identify a location associated with other hazards in the seabed, such as a location of sunken boat or other underwater structure that is not safe for swimmers. The size and location of the deep water warning 430 may identify an actual location of the deeper seabed. Additionally, the deep water warning 430 may be color coded to provide a visual indication of an actual depth of the seabed.

The hazardous contamination warning 440 may identify a region of water contamination. For example, the hazardous contamination warning 440 may identify a location where the vessel 200 detects contaminants or water conditions associated with unsafe contamination, such as low dissolved oxygen levels or low water clarity. In another example, the hazardous contamination warning 440 may identify a location associated with conditions that may lead to water contamination, such as a location receiving output from a water treatment facility or a location having water currents that trap and accumulate contaminants. The size and location of the hazardous contamination warning 440 may identify an actual location of the contamination. Additionally, the hazardous contamination warning 440 may be color coded to provide an visual indication of a contamination type and/or a concentration of the contamination (e.g., parts per million)

As shown in FIG. 4, the alert map 401 may further provide information regarding locations of prior swimmer rescues 450. For example, the rescue locations 450 may include a location to which the vessel 200 has moved to intercept and assist a distressed swimmer In another example, the rescue locations 450 may include a location where a distress swimmer is previously rescued by safety officials at the beach. Thus, the computing device 400 may collect information from user devices 300 of the safety officials when a rescue is performed. For example, the user devices 300 may output a rescue notification when the safety official enters the water or uses the user device 300 to call for additional assistance.

The alert map 401 may further identify other information about a shore region, such as locations of safety officials (e.g., lifeguards) 460, and locations of amenities 470. The locations of safety officials 460 and the locations of amenities 470 may be identified, for example, based on information provided through third parties, such as other websites or publication. The locations of safety officials 460 may be dynamically determined, such as identifying real-time location of user devices 300 of safety officials 460. For example, the user devices 300 may periodically (e.g., every 10 seconds) output information identifying the safety official and a location for that safety official, and the map 401 can be updated to reflect this information. In this way, a swimmer may use the map 401 to determine swimming locations near a lifeguard or other safety official.

In one example, the alert map 401 may be provided through a web-based information and alerts website that is part of the system to enable subscribers to assess the immediate swimming conditions at a beach of they are considering visiting and at a beach they are currently visiting. For example, the computing device 400 may implement software to generate a website that issues alerts of dangerous beach conditions, such as nearby lightning strikes, imminent lightning strikes, water quality conditions, and rip currents and their locations as a function of time and tide. These alerts may also be issued to user devices 300 of emergency personnel on a graphical touch screen beach safety system interface.

The computing device 400 may include analysis software to generate the alert map 401 to alert web system subscribers to recent rip current activity and rip locations at beaches of interest in recent days and also the water quality hazards existing at those beaches in recent days (e.g., during a last seven days). These alerts are superimposed on map 401 of each particular beach for which data has been measured to enable users to identify the dangerous swimming locations for the present day and those dangers that existed on recent days.

The computing device 400 may use sensor data 130 from the vessel 200 to constantly monitor the beach water quality and comparing the measured data against official health department critical levels. Alert map 401 or another alert may be triggered if safe levels are exceeded. Thus, different alert map 401 may be provided to different user devices 300. For example, one alert map 401 may be sent to the graphical touch screen on the beach for safety personnel to identify the dangerous conditions and rescue locations, and another alert map 401 may be sent to subscribers to the beach alert website to provide an alert of certain conditions, such as nearby lightning strikes and forecasts for lightning in the beach area.

The alert maps 401 also enable post-event analysis and characterization of the beach rip current dynamics as a function of the time, weather, and tide. For example, time, tidal information, wave and wind information, GPS coordinates, rip current magnitude and width, and depth variation at several locations across the rip are recorded. This data will be subsequently analyzed by the computing device 400 for a given beach to identify correlations that exist with rip current occurrence. This analysis may provide a basis for future warning alerts to safety personnel and subscribers to the service when such conditions are forecast. For example, the computing device 400 may identify conditions (e.g., weather, tides, etc.) associated with a rip current detected by the vessel 200, the computing device 400 may forward the alert map 401 or other warning when similar conditions are detected, even when the vessel 200 is not used.

Thus, the vessel 200 may continuously use sensors to measure data and transmitting measured data to the user device 300 and/or computing device 400, as well as storing measured data onboard in data files. The data are the locations and physical characteristics of each rip current, the water quality measurements, the vessel dynamic state, and the tidal conditions. When dangerous values (that may be pre-set or may be dynamically modified for each beach) are measured for water velocity or water quality alerts will be broadcast to beach safety personnel for actions they deem appropriate. The GPS coordinates of rip currents may be included in the broadcasts as well as the GPS coordinates of harmful contaminants. This information may also be broadcast or distributed via a website for information purposes to website subscribers and safety officials. As shown in FIG. 4, the website may generate the alert map 401 by plotting the GPS coordinates onto a local beach map so users may see exactly where the dangerous condition are present exists.

While various components of the alert map 401 have been described, it should be appreciated that the alert map 401 may include additional, fewer, or different elements than those depicted in FIG. 4. For example, alert map 401 may include various data, such as an indication of the sensor path 110 traveled by the vessel 200 so that a user can better determine where data is collected and not collected. Furthermore, the alert map 401 depicted in FIG. 4, although described as being generated by computing device 400, may be generated by the vessel 200 and/or the user device 300.

Figure 5:
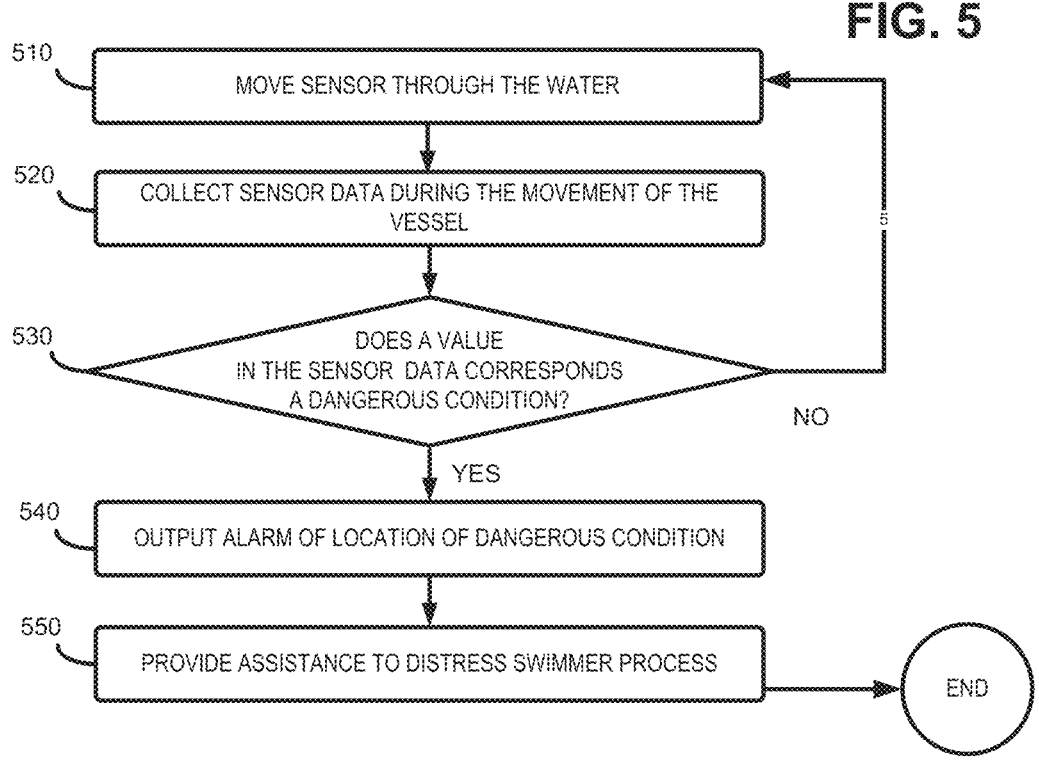
FIG. 5 is a flow chart illustrating a process to detect hazardous water conditions in the environment shown in FIGS. 1A-1C according to certain embodiments.

FIG. 5 is a flow chart showing a dangerous condition detection process 500 to detect hazardous conditions, such as a rip current. In the following discussion, aspects of the dangerous condition detection process 500 are described as being performed by the vessel 200. It should be appreciated, however, that one or more portions of the dangerous condition detection process 500, such as the collection or analysis of sensor data may be performed by the user device 300, the computing device, or another, third-party device that is not shown.

Referring now to FIG. 5, sensors may be moved through the water (step 510). For example, as previously described, the vessel 200 carrying sensors 250 may be programmed or otherwise instructed to travel through the water along the sensing path 110, such as to travel along a set path that includes regions associated with previously identified hazardous conditions. In another example, the vessel 200 may repeatedly travel parallel to the beach and at different distances from the beach. In another example, the vessel 200 may travel through the water along a dynamically determined path, such as to travel along a path associated with certain detected currents or water flows or to travel toward one or more swimmers in the water.

The sensors 250 on the vessel 200 may collect sensor data while the vessel 200 is moving through the water (step 520). For example, offshore-directed currents or other conditions may be sensed and measured as the vessel 200 moves through the currents at a speed and heading set by the operator of the user device 300. Furthermore, the vessel 200 may include a velocity sensor that measures the magnitude of the rip current speed, and the width of the rip at that location.

When the vessel 200 travels along a path that includes several transits across the rip at increasing distances off the beach, the vessel 200 may determine the seaward extent of the rip and the decreasing magnitude of the rip current velocity. In addition to the characterization of the rip current velocity, a depth sensor measures the varying depth of the water as the vessel 200 traverses the current. A set of traverses at increasing distances off the beach will thus characterize the physical conditions of the bottom at that location and time. This information collectively is the morphology of the rip current. This data is stored and correlated with the time stamp of the data, the tidal conditions, and the local wind and wave conditions and made available for analysis by the oceanography and beach wave dynamics communities.

Offshore-directed currents may be sensed and measured as the vessel 200 moves through the currents at a speed and heading set by the operator of the beach-based graphical user control interface and radio transmitter. In addition to the dynamic response of the vehicle indicating the presence of the rip current, a velocity sensor enables the measurement of the magnitude of the rip current speed, and the width of the rip at that location. Several transits across the rip at increasing distances off the beach may determine the seaward extent of the rip current and the decreasing magnitude of the rip current velocity.

In addition to the characterization of the rip current velocity, a depth sensor measures the varying depth of the water as the vehicle traverses the current. A set of traverses at increasing distances off the beach will thus characterize the physical conditions of the bottom at that location and time. This information collectively is the morphology of the rip. This data is stored and correlated with the time stamp of the data, the tidal conditions, and the local wind and wave conditions and made available for analysis by the oceanography and beach wave dynamics communities.

The collected sensor data may be evaluated to determine whether a value in the sensor data corresponds to a dangerous condition (step 530). For example, the collected sensor data may be evaluated to determine whether an outward current flow is detected, and speed or other attribute of the outward current flow may be compared to safety threshold levels to determine whether a dangerous rip current is present. Furthermore, as previously described, attributes of the dangerous condition, such as a location and speed of the rip current may be determined based on the sensor data. Additionally, when a dangerous condition is identified, the vessel 200 may modify its travel path through the water and may collect additional sensor data in steps 510 and 520 to determine attributes of the dangerous condition. For example, when a rip current is identified based on traversing water near a beach, the vessel 200 may travel to traverse one or more times further from the beach to measure the distance that the rip current extends out from the shore. Otherwise, when no dangerous condition is identified, the vessel may continue to travel through the water and collect additional sensor data in steps 510 and 520.

Additionally, an alarm may be outputted when a dangerous condition is identified (step 540). For example, when a dangerous rip current is identified, the vessel 200 may output or otherwise trigger a rip current alert which may be transmitted both visually by a red LED on the vessel 200 and also by an audio and visual alert outputted by the user device 300 on the beach. In addition to the dynamic response of the vessel 200 indicating the presence of the rip current, the vessel 200 may also output attributes of the dangerous condition to the user device 300. For example, an onboard GPS on the vessel 200 may determine a location of the rip current or other dangerous condition, and the vessel 200 may provide information on the location of the rip current to the user device 300. Then, an operator of the user device 300 may place warning signs or other indicators on the beach or may issue verbal warnings to swimmers in the vicinity of the dangerous condition.

The dynamic vehicle response to current detection triggers an alert signal that is RF transmitted to the smart device screen on the beach. An onboard GPS will provide to the smart-device operator the GPS coordinates of the rip current so that, if this was not known before, warning signs or indicators may be placed on the beach or verbal warnings issued to swimmers in the vicinity.

Furthermore, the warning may include a map (e.g., alert map 401) identifying a location of the dangerous condition. For example, the user device 300 may visually display rip current location and magnitude on a beach map. Furthermore, when a dangerous condition is detected, the vessel 200 may further provide assistance to distressed swimmers in the water and/or to beachgoers who are not in the water (step 550).

While various steps of the dangerous condition detection process 500 have been described, it should be appreciated that the dangerous condition detection process 500 may include additional, fewer, or different steps than those depicted in FIG. 5. For example, dangerous condition detection process 500 may further include collecting sensor data from other sources and/or controlling the vessel 200 to travel along a modified path to collect additional sensor data about a suspected dangerous condition.

Figure 6:
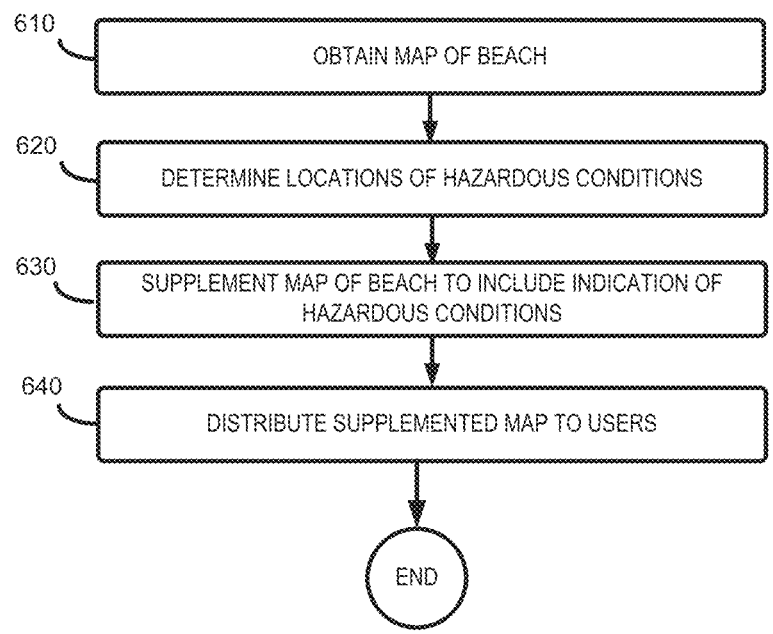
FIG. 6 is a flow chart illustrating a process to distribute an alert regarding a detected hazardous water condition in the environment shown in FIGS. 1A-1C according to certain embodiments.

FIG. 6 is a flow chart showing a process 600 to output a warning regarding a dangerous water condition, such as a rip current. In the following discussion, aspects of the dangerous condition warning process 600 are described as being performed by the computing device 400. It should be appreciated, however, that one or more portions of the dangerous condition warning process 600, such determining the locations of the hazardous conditions may be performed by the vessel 200, the user device 300, or another, third-party device that is not shown.

As shown in FIG. 6, the dangerous condition warning process 600 may include obtaining a map of a beach or other location (step 610). For example, the map may be generated based on the sensor data 130 collected by the vessel 200. In another example, the map of the beach may be obtained from a third party source. For example, the computing device 400 may determine a location associated with the vessel based on GPS or other sensor data collected by the vessel and may obtain a stored map associated with the determined location.

Locations of dangerous conditions are then identified (step 620). For example, one or more locations of the vessel 200 where specific sensor data outside a prescribed threshold value or a range of threshold values may be determined. The location of the dangerous condition may be determined based on the location(s) of these sensor data. In another example, the location of the dangerous condition may be determined based on the location(s) of previously identified dangerous conditions.

The map may be supplemented to include an indication of the dangerous condition (step 630). For example, the computing device 400 may superimpose a graphical symbol associated with the dangerous condition at a portion of the map corresponding to the location of the dangerous condition. The graphical symbol associated with the dangerous condition may be graphically modified to indicate, for example, a detected direction, danger level (e.g., strength), size, etc. of the dangerous condition. As previously described with respect to the alert map 401 in FIG. 4, the computing device 400 may also supplement the map to include other information, such as location of user devices 300 associated with safety officials and/or locations of amenities. Furthermore, different alert maps 401 may be generated for different users, such as to generate one alert map 401 with dangerous conditions for beach goers, and another alert map 401 with prior rescue information for beach safety officials. In other example, one alert map 401 with dangerous water conditions near land may be generated for swimmers, and another alert map 401 with dangerous water conditions further from land may be generated for boaters.

The supplemented map may be distributed to users (step 640). For example, the supplemented map (e.g., alert map 401) may be distributed to subscribers of a website. In another example, the supplemented map may be broadcast to user devices 300 associated with certain users, such as user devices 300 present at a beach associated with the supplemented map.

Thus, the system described herein can constantly monitor the beach water quality and compare the measured data against official health department critical levels. An alert will be triggered if levels are exceeded. The alert will be sent to the graphical touch screen on the beach for safety personnel response notification to swimmers and to subscribers of the web-based beach safety alerting system. Subscribers to the beach alert website will also receive an alert of nearby lightning strikes and forecasts for lightning in the beach area.

The system is also designed to enable post-event analysis and characterization of the beach rip current dynamics as a function of the time, weather, and tide. Time, tidal information, wave and wind information, GPS coordinates, rip current magnitude and width, and depth variation at several locations across the rip are recorded. This data will be subsequently analyzed for a given beach to identify correlations that exist with rip current occurrence. This data will provide a basis for future warning alerts to safety personnel and subscribers to the service when such conditions are forecast.

While various steps of the dangerous condition warning process 600 have been described, it should be appreciated that the dangerous condition warning process 600 may include additional, fewer, or different steps than those depicted in FIG. 6. For example, the dangerous condition warning process 600 may further outputting a warning by the vessel 200 to swimmers near a dangerous condition, such as maneuvering the vessel 200 to a location associated with a dangerous condition and then outputting an audible warning (e.g., a siren) or a visional warning (e.g., a flashing light) to warn swimmers about a detected dangerous condition.

Figure 7:
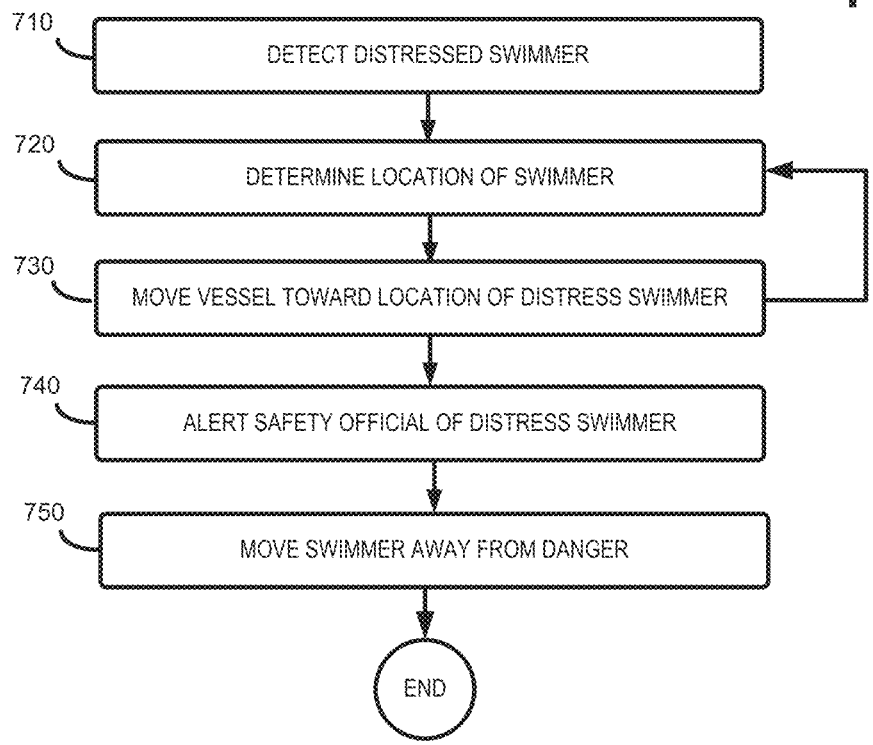
FIG. 7 is a flow chart illustrating a process to assist a distressed swimmer in the environment shown in FIGS. 1A-1C according to certain embodiments.

FIG. 7 is a flow chart showing a process 700 to provide assistance to a distressed swimmer In the following discussion, aspects of the distressed swimmer assistance process 700 are described as being performed by the vessel 200. It should be appreciated, however, that one or more portions of the swimmer assistance process 700, such determining a location of the distressed swimmer, may be performed by the user device 300, the computing device 400, or another, third-party device that is not shown.

As shown in FIG. 7, the distressed swimmer assistance process 700 may include detecting a distressed swimmer (step 710). For example, sensors 250 on the vessel 200 may detect audio indications (e.g., yells for help) or visual indications (e.g., arm waving) indicating a call for assistance by a swimmer In another example, the vessel 200 may automatically move toward to swimmer at a location associated with a determined dangerous condition. The vessel 200 may also move toward the distressed swimmer based on receiving instructions from the user device 300.

The vessel 200 may determine a location of the distressed swimmer (step 720). The location of the distressed swimmer may be determined based on sensor data collected by the vessel 200. For example, a camera on the vessel 200 may capture images, and the images may be processed to identify a shape associated with the swimmer Additionally, a thermal camera on the vessel 200 may capture temperature images, and the temperature images may be processed to identify a shape associated with the swimmer In another example, the vessel may receive instructions about a location of the swimmer from the user device 300.

The vessel 200 may move toward the location of the distressed swimmer (step 730). For example, the vessel 200 may activate a propulsion system 220 to move toward the location of the distressed swimmer. The vessel 200 may move to contact the swimmer or may stop at a threshold distance from the swimmer to avoid contacting the swimmer.

In one implementation, the vessel 200 may function to assist two or more swimmers concurrently, such as a parent swimming with a child. For example, as previously described, the vessel 200 may include buoyancy devices 280 that provide flotation assistance capability on both port and starboard sides of the board 211, and when the vessel 200 maneuvers to provide assistance to two distressed swimmers simultaneously, each swimmer may grab a respective one of the buoyancy devices 280. When the swimmers are close together, the vessel 200 may determine and travel along a route to a position between the swimmers. In another example in which the swimmers are separated by more than a threshold distance, the vessel 200 may move toward one of the swimmer and then, after that swimmer grabs onto the board 211, move toward the other swimmer.

The distressed swimmer assistance process 700 may return to step 720, and the vessel 200 may collect additional sensor data when near the swimmer(s) (e.g., within a first threshold distance) and determine an updated location for the swimmer(s), such as to determine whether a rip current has carried the swimmer(s) further from the beach. Additionally, when the swimmer(s) cannot be detected at a last known location for the swimmer, the vessel 200 may collect additional sensor data to determine whether the swimmer(s) is under water.

Continuing with FIG. 7, the vessel 200 may forward a notification to a safety official (step 740). For example, the vessel 200 may forward a notification message to a user device 300 of the safety official. The notification message may include, for example, information identifying a location of the swimmer(s). The notification message may further include information identifying any dangerous conditions identified at or near the location of the swimmer(s). The vessel 200 may further output a light or audio to attract the attention of the safety official.

Thus, if the distressed swimmer(s) is in a rip current or is otherwise in need of assistance, immediate assistance can be provided from shore using the smart software-enabled system. The vehicle contains a video camera and a thermal imaging camera which transmits visual and IR video images of the swimmer(s) to the smart beach handheld device 300. If the swimmer(s) goes under the water an acoustic transponder can locate the swimmer and its distance and heading information will be input to the controller for issuing navigation commends to bring the vehicle to the underwater swimmer. The system also contains two acoustic transmitters for verbal communication between the beach safety personnel and the swimmer. The images of the swimmer(s) will provide information to the operator that will be of assistance in maneuvering the vehicle, via joystick or touch screen, to a position alongside the swimmer. The vessel 200 may be equipped with one or more external buoyancy support devices that can keep the swimmer(s) afloat and, at the same time, not capsize the vessel 200, until rescue personnel arrive.

The swimmer(s) can be instructed, via the two-way waterproof radio, to grab a flotation system on the vessel and to stay calm until rescue personnel reach them. In one example, the vessel 200 may receive audio content, such as oral instructions from the safety official, and the vessel 200 may output the audio content to the swimmer(s). The vessel 200 may also record or otherwise capture audio content from the swimmer(s) and forward the audio content to the user device 300 to provide two-way communications between the swimmer and the safety official.

The vessel 200 may move the swimmer(s) from danger (step 750). For example, the vessel 200 may be held by the swimmer(s), and the vessel 200 may engage a propulsion system 220 to move the swimmer(s) toward safety. As previously described, the vessel 200 may determine a route toward land and engage the propulsion system 220 to move the swimmer(s) along the route. The route may correspond, for example, to a shortest path to land, a route toward other distressed swimmer(s), and/or a route to avoid one or more identified dangerous conditions.

While various steps of the distressed swimmer assistance process 700 have been described, it should be appreciated that the distressed swimmer assistance process 700 may include additional, fewer, or different steps than those depicted in FIG. 7. For example, the distressed swimmer assistance process 700 may further include automatically activating a buoyancy device 280 to improve a stability of the vessel 200 when a distressed swimmer is identified. In another example, the distressed swimmer assistance process 700 may further include storing data identifying a location of the distressed swimmer so that the map 401 can be updated.

Figure 8:
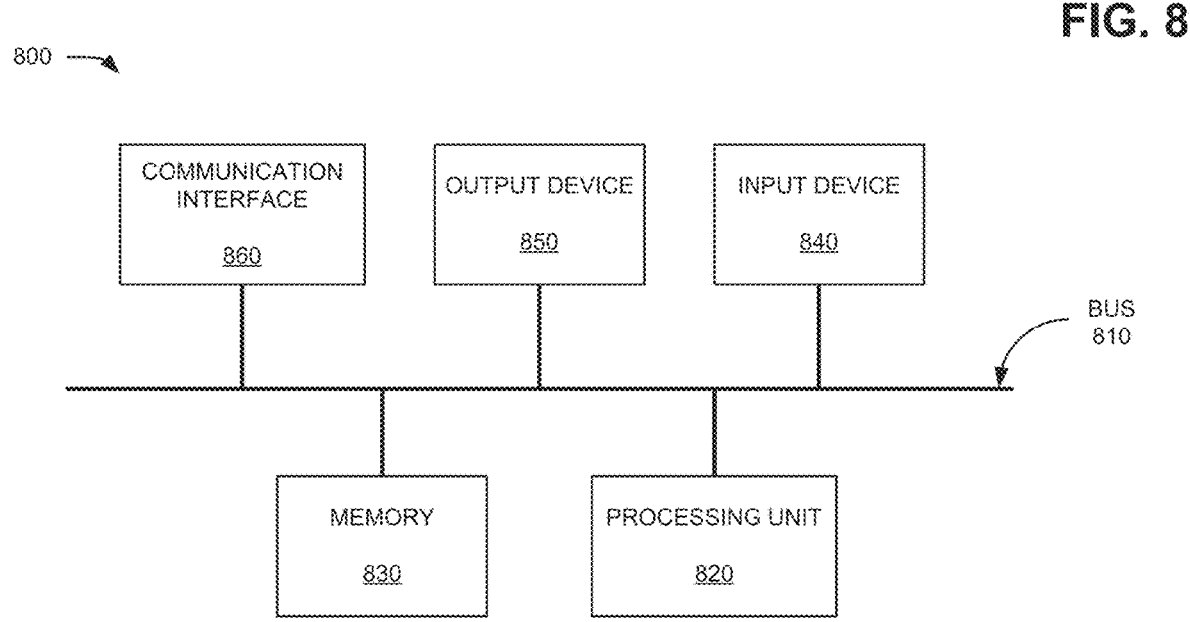
FIG. 8 illustrates a schematic diagram of sample components included in a device used in the environment of FIGS. 1A-1C according to certain embodiments.

FIG. 8 is a diagram showing examples of components that may be included in a device 800. Each of the devices illustrated in FIGS. 1A-1C, 2, and 3 may include one or more devices 800. For example, vessel 200, user device 300, and computer device 300 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Similarly, output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software. As used herein, the term "circuitry" may include hardware, software, or a combination thereof.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vessel comprising:
   a body that floats in water;
   one or more thrusters provided on a bottom surface of the body;
   one or more sensors provided on the body; and
   a controller configured to:
      selectively activate the thrusters to cause the vessel to move along a path through the water;
      receive sensor data from the one or more sensors while the vessel is moving along the path;
      determine, based on the sensor data, when the vessel is performing a pass of a dangerous condition in the water while moving along the path,
      after determining that the vessel is performing the pass of the dangerous condition while moving along the path, control the thrusters to adjust a heading of the vessel from the path such that vessel performs one or more additional passes through the dangerous condition, and update, during the one or more additional passes of the dangerous condition, the sensor data to determine a variation in the dangerous condition; and
      store information regarding the dangerous condition in the water, wherein the information identifies the variation in the dangerous condition.

2. The vessel of claim 1, wherein the path extends along a shore, the sensor data relates to variable locations and variable directions of currents in the water, the dangerous condition relates to an alongshore or rip current, and the warning identifies at least one attribute of the alongshore or the rip current.

3. The vessel of claim 2, wherein the dangerous condition relates to the rip current, and
   wherein the controller further identifies at least one of:
      a location of the rip current,
      a variable velocity and a variable direction of the rip current as it moves away from the shore,
      a variable width of the rip current as it moves away from the shore, a variable depth of the water in the rip current as it moves away from the shore, or a change in dynamic characteristics of the rip current at different distances away from the shore for each occurrence of a rip current along the shore.

4. The vessel of claim 1, further comprising at least one of an audio speaker or a light source, wherein the controller is further configured to selectively activate the at least one of the speaker or the light source when the dangerous condition is sensed.

5. The vessel of the claim 1, further comprising a transceiver, wherein the controller is further configured to manage the transceiver to forward a message to another device regarding the dangerous condition, the message including information about the dangerous condition and the sensor data.

6. The vessel of claim 5, wherein the other device is a user device associated with safety personnel, and wherein the controller is further configured to track a time-varying trajectory of the dangerous condition based on the sensor data transmitted to the user device.

7. The vessel of claim 6, wherein the user device includes a touch screen providing a graphical user interface that presents at least a portion of the sensor data and transmits instructions for a continuous variation in a frequency and a direction of rotation for each thruster independently to result in the path for the vessel to adjust the heading of the vessel from the path.

8. The vessel of claim 5, wherein the other device is a computing device that generates a map identifying a location of the dangerous condition, and wherein the computing device forwards the map to one or more user devices.

9. The vessel of claim 1, wherein the one or more sensors includes a sensor that measures a composition of the water, and wherein the controller is further configured to determine when a contaminant is detected in the water based on the composition of the water and a location of the vessel where contaminant is detected.

10. The vessel of claim 7, wherein the controller is further configured to:

determine, based on the sensor data, when a distress swimmer is present is water; and control, via fingertip motions to the touch screen, the frequency and the direction of rotation of each thruster independently to move the vessel toward the distressed swimmer.

11. The vessel of claim 10, further comprising a flotation device that is provided on the body and is configured to be grabbed or activated by the distressed swimmer when the vessel moves to a location associated with the distress swimmer.

12. The vessel of claim 10, wherein the one or more sensors include a microphone to capture audio data, the vessel further includes a speaker to output audio, and the controller further establishes communications with a device of a safety official to enable a two-way communications between the swimmer and the safety official using the microphone and the speaker.

13. The vessel of the claim 10, wherein the one or more sensors further include a video camera, and wherein the controller is figured configured to control the video camera to capture at least one of a video or thermal images at a location associated with the distressed swimmer and forward the captured video or thermal images to a safety official.

14. A method comprising:

selectively activating multiple thrusters of a vessel including controlling at least one of a frequency or a direction of rotation for each of the thrusters to cause the vessel to travel along a path in water;

detecting by one or more sensors provided on the vessel, conditions in the water along the path;

determining, based on the conditions in the water along the path, when the vessel is making a pass of a dangerous condition in the water while travelling along the path;

modifying, based on the determining that the vessel is making the pass of the dangerous condition, at least one of the frequency or the direction of rotation for one or more of the thrusters such that vessel moves from the path to perform one or more additional passes of the dangerous condition; and measuring, by the one or more sensors, dynamic characteristics of the dangerous condition as the vessel performs the one or more additional passes of the dangerous condition.

15. The method of claim 14, wherein a portion of the path extends along a shore, the sensor data relates to locations and directions of currents in the water, the dangerous condition relates to an alongshore or a rip current, and at least one attribute of the alongshore or rip current is determined based on the conditions in the water along the path and the dynamic characteristics of the dangerous condition.

16. The method of claim 15, further comprising:

using at least one of discrete laptop commands or fingertip touch sensor commands to independently vary at least one of the frequency or the direction of rotation of each of the thrusters to cause the vessel to travel to identify at least one of a location of the alongshore or rip current, a velocity of the alongshore or rip current, a width of the alongshore or rip current, or a depth of the water at the alongshore or rip current; and modifying the frequency and direction of rotation of each thrusters independently to cause the vessel move away from the shore as the vessels performs the one or more additional passes across the dangerous condition, wherein the vessel measures at least one of:

a velocity variation across the alongshore or rip current at locations as the vessel moves away from the shore, a width variation of the alongshore or rip current at the locations as the vessel moves away from the shore, a depth variation across the alongshore or rip current at the locations as the vessel moves away from the shore, or an angle and a velocity of the alongshore or rip current as the vessel moves away from the shore.

17. The method of claim 14, further comprising:

generating a map identifying a location of the dangerous condition, the map identifying a magnitude and a direction of the dangerous condition at each location of data collection as the vessel moves; and forwarding the map to one or more user devices.

18. The method of claim 14, wherein one of the one or more sensors measures a composition of the water, and method further comprises:

determining, based on the composition of the water, when a contaminant is present in the water; and determining a location of the vessel when contaminant is detected.

19. The method of claim 14, further comprising:
  determining, based on data collected by the one or more sensors, when a distressed swimmer is present in the water; and
  controlling the vessel based on received command or touch inputs to independently vary at least one of the frequency or the direction of rotation of each of the thrusters to move the vessel toward the distressed swimmer and to maintain a particular position control adjacent to the distressed swimmer so that the distressed swimmer can be assisted with buoyancy support from the vessel and can be provided with audio instructions for using one or more buoyancy devices deployed from the vessel.

20. The method of claim 19, further comprising:
  determining, based on the data collected by one or more sensors, a location of the distressed swimmer; and
  forwarding information identifying the location of the distressed swimmer to a safety official.

21. The vessel of claim 1, wherein the one or more additional passes include a first additional pass and a second additional pass, and
  wherein the controller, when adjusting the heading of the vessel such that the vessel performs the additional passes of the dangerous condition, is further to:
    adjust the heading of the vessel from the path such that the vessel performs the first additional pass at a first distance from the path, and
    adjust the heading of the vessel after performing the first additional pass such that the vessel performs the second additional pass at a second distance from the path, the second distance being greater than the first distance.

* * * * *